United States Patent
Andry et al.

(10) Patent No.: US 10,079,375 B2
(45) Date of Patent: Sep. 18, 2018

(54) DUAL SEAL MICROBATTERY AND METHOD OF MAKING

(71) Applicant: International Business Machines Corporation, Armonk, NY (US)

(72) Inventors: Paul S. Andry, Yorktown Heights, NY (US); Joana S. Branquinho Teresa Maria, New York, NY (US); Jeffrey Gelorme, Yorktown Heights, NY (US); Jae-Woong Nah, Closter, NJ (US); Adinath S. Narasgond, Yonkers, NY (US); Bucknell C. Webb, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 322 days.

(21) Appl. No.: 14/983,740

(22) Filed: Dec. 30, 2015

(65) Prior Publication Data
US 2017/0194607 A1 Jul. 6, 2017

(51) Int. Cl.
*H01M 2/08* (2006.01)
*H01M 6/40* (2006.01)
*H01M 2/02* (2006.01)
*H01M 10/04* (2006.01)

(52) U.S. Cl.
CPC ............ *H01M 2/08* (2013.01); *H01M 2/021* (2013.01); *H01M 6/40* (2013.01); *H01M 10/0436* (2013.01)

(58) Field of Classification Search
CPC ....... H01M 2/02–2/0202; H01M 2/04–2/0404; H01M 6/40; H01M 6/42; H01M 6/44–6/46; H01M 10/04–10/0404; H01M 10/0436; H01M 10/058; H01M 10/0585; H01M 10/281; H01M 10/283; H01M 10/287–10/288; H01M 10/38
See application file for complete search history.

(56) References Cited

U.S. PATENT DOCUMENTS

5,378,557 A * 1/1995 Murata ............... H01M 2/0212
429/127
5,561,004 A 10/1996 Bates et al.
(Continued)

*Primary Examiner* — Jonathan Crepeau
*Assistant Examiner* — Jacob Buchanan
(74) *Attorney, Agent, or Firm* — Cantor Colburn LLP; Louis Percello (57) ABSTRACT

A method of forming a flexible microbattery and battery is provided. The method including: forming a film with a cavity therein; applying a first outer flexible substrate to a first side of the film; applying a second outer flexible substrate to a second opposite side of the film, wherein a cathode, an anode, a separator and an electrolyte are located within the cavity and the film provides a first seal about the cathode, the anode, the separator and the electrolyte and wherein the first seal extends between the first outer flexible substrate and the second outer flexible substrate; cutting a trench through the first outer flexible substrate, the film and the second outer flexible substrate after the first seal is formed; disposing a curable material in the trench; curing the curable material to provide a second seal, wherein the first seal is located between the cavity and the second seal.

18 Claims, 7 Drawing Sheets

(56) References Cited

U.S. PATENT DOCUMENTS

| | | | |
|---|---|---|---|
| 2003/0059673 A1* | 3/2003 | Langan | H01M 2/0215 429/127 |
| 2006/0216589 A1* | 9/2006 | Krasnov | H01M 2/0404 429/175 |
| 2007/0139001 A1* | 6/2007 | Hahn | H01M 2/0277 320/112 |
| 2008/0003492 A1* | 1/2008 | Bates | H01M 2/0207 429/66 |
| 2013/0216904 A1 | 8/2013 | Jarry | |
| 2017/0018810 A1* | 1/2017 | Ladroue | H01M 4/0404 |

* cited by examiner

DUAL SEAL MICROBATTERY AND METHOD OF MAKING

BACKGROUND

The present invention relates to microbatteries and more specifically, to a flexible microbattery having an improved peripheral seal and method of making.

All batteries require some form of a containing barrier to water and electrolytes or other contaminants that would adversely affect the battery. For many battery chemistries, battery performance is improved if the barrier also reduces air and vapor transport. Microbatteries present special sealing challenges as the available area and volume to form the closing seals to the barrier container are very small and any volume used for sealing detracts from the volume available for the anode and cathode materials. Any sealing method also has to be compatible with manufacturing assembly requirements.

Therefore, a need exists for a microbattery with a durable seal.

SUMMARY

According to an embodiment, a method of forming a flexible microbattery with a dual seal is provided. The method including the steps of: forming a film with a cavity therein; applying a first outer flexible substrate to a first side of the film; applying a second outer flexible substrate to a second opposite side of the film, wherein a cathode, an anode, a separator and an electrolyte are located within the cavity and the film provides a first seal about the cathode, the anode, the separator and the electrolyte and wherein the first seal extends between the first outer flexible substrate and the second outer flexible substrate; cutting a trench through the first outer flexible substrate, the film and the second outer flexible substrate after the first seal is formed; disposing a curable material in the trench; curing the curable material to provide a second seal, the second seal extending between the first outer flexible substrate and the second outer flexible substrate, wherein the first seal is located between the cavity and the second seal.

According to another embodiment, a method of forming a plurality of flexible microbatteries with a dual seal is provided. The method including the steps of: forming a film with a plurality of cavities therein; applying a first outer flexible substrate to a first side of the film; applying a second outer flexible substrate to a second opposite side of the film, wherein a cathode, an anode, a separator and an electrolyte are located within each one of the plurality of cavities and the film provides a first seal about the cathode, the anode, the separator and the electrolyte of each of the plurality of batteries and wherein the first seal extends between the first outer flexible substrate and the second outer flexible substrate; cutting a trench through the first outer flexible substrate, the film and the second outer flexible substrate of each of the plurality of batteries after the first seal is formed; disposing a curable material in the trench; curing the curable material to provide a second seal, the second seal extending between the first outer flexible substrate and the second outer flexible substrate of each of the plurality of batteries, wherein the first seal is located between the cavity and the second seal.

According to yet another embodiment, a flexible microbattery is provided. The flexible microbattery having: a first outer flexible substrate; a second outer flexible substrate; a film located between the first outer flexible substrate and the second outer flexible substrate; a cathode, an anode, a separator and an electrolyte located within a cavity of the film, wherein the film provides a first seal about the cathode, the anode, the separator and the electrolyte and wherein the first seal extends between the first outer flexible substrate and the second outer flexible substrate; and a second seal disposed about an outer periphery of the first seal, the second seal also extending between the first outer flexible substrate and the second outer flexible substrate.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Existing small/microbatteries are typically of two types: small button cells consisting of a rigid metal can that is closed by swaging over a plug with an embedded second electrode, or an open stack or roll of layers of contacts/anode/cathode/electrolyte and separators that is encased in a sealing envelope of which is then sealed shut.

This present application is related to layered structured batteries with an improved outer envelope or seal. In one embodiment, the microbattery will have a first peripheral seal defined by an adhesive tape and a second curable material located about the first peripheral seal. Referring initially to FIGS. 1-8, a microbattery 10 formed in accordance with one non-limiting embodiment of the present disclosure is illustrated.

The battery 10 is made with a film 12 having an opening or cavity 14 that is glued/attached with an adhesive 16 between two substrates 18, 20 in order to form microbattery 10. In one embodiment, the substrates 18, 20 may be referred to as flexible substrates or a first outer flexible substrate 18 and a second outer flexible substrate 20. Film 12 may also be referred to as a double sided adhesive tape having a patterned film 17 with cavities 14 and slots 15 formed therein and adhesives 16 applied thereto. As will be discussed herein, slot 15 formed in the film 12 is used in conjunction with a cut trench to form a secondary seal of the battery 10. In one embodiment, the adhesives 16 are applied to opposite sides of the film. In the illustrated embodiment, a top substrate or first substrate 18 with an anode 22 and a lower or second substrate 20 with a cathode 24 are secured together with an electrolyte 26 therebetween as is known in the related arts. As illustrated, the anode 22, cathode 24 and electrolyte 26 are located within cavity 14 when the layers of the battery 10 are assembled. The adhesives 16 may be located on opposite sides of the adhesive tape or film 12. Still further at least two or several layers of adhesive tape of film 12 may be provided in order to provide the necessary height of the battery to accommodate anode 22, cathode 24 and electrolyte 26 in cavity 14. For example, two or more layers 12 with their associated cavities 14 and slots 15 are secured to each other. Although battery 10 is illustrated as having a rectangular shape this is merely an example of one non-limiting configuration other non-limiting configurations may include circular, cylindrical, elliptical, oval, etc. and thus the shape of the battery and its components may be configured to anyone of the these configurations.

Figure 1:
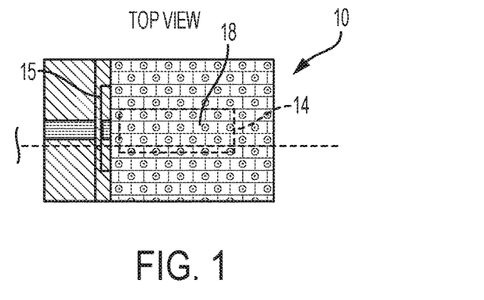
FIG. 1 is a top view of an assembled microbattery prior to a sealing process.
Figure 2:
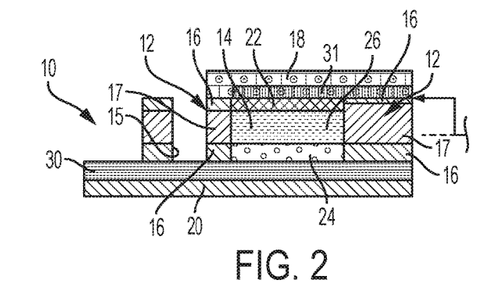
FIG. 2 is a cross section view of the microbattery of FIG. 1.
Figure 3:
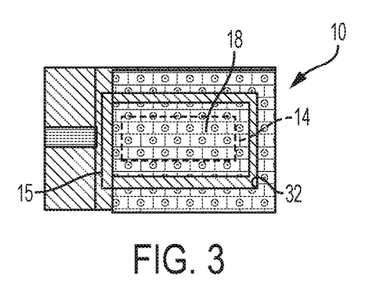
FIG. 3 is a top view of an assembled microbattery during a first step of a sealing process.
Figure 4:
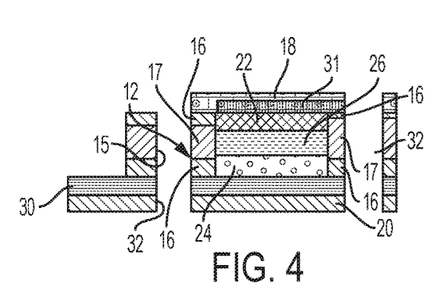
FIG. 4 is a cross section view of the microbattery of FIG. 3.
Figure 5:
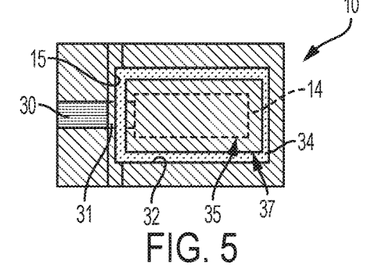
FIG. 5 is a top view of an assembled microbattery during a second step of the sealing process.
Figure 6:
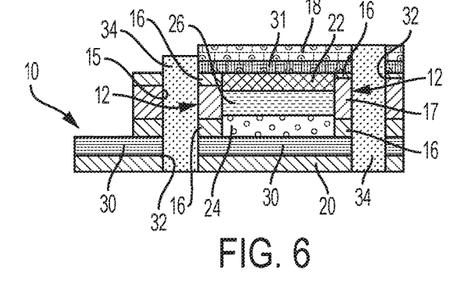
FIG. 6 is a cross section view of the microbattery of FIG. 5.

FIG. 2 is a cross sectional view of the joined substrates 18 and 20. Also, shown in FIGS. 1-8 are metal contacts or current collector films 30, 31. The contact 30 is secured to cathode 24 while the contact 31 is secured to anode 22 such that electrical power may be withdrawn from the battery 10 in accordance with known technologies. The cavity 14 and slot 15 are located over the metal contacts or current collector films 30, 31 during the assembly process. As mentioned above, the cavity 14 and slot or slots 15 are made in the adhesive tape 12 prior to the assembly of the battery 10 as illustrated in FIGS. 1-8. After the two substrates 18 and 20 are joined together with the adhesive 16 of the adhesive tape layer 12, a trench 32 is etched or laser-cut or scribed through the stack of materials.

In some embodiments, the current collectors or contacts 30, 31 may comprise conductive materials, including but not limited to copper, nickel, gold, titanium, carbon, indium tin oxide, or any combination of such. In some embodiments, current collectors or contacts 30, 31 are conductive materials, including copper, nickel, gold, titanium, carbon, indium tin oxide, or any combination of such, coated on non-conductive materials, such as polymer.

The anode 22 and cathode 24 are electrodes and may be composed of any material useful as an electrode in a microbattery system. The cathode or cathode layer 24 may include, for example, an oxide, such as iron oxide, cuprous oxide, cupric oxide, cobaltic oxide, manganese dioxide, lead dioxide, silver oxide, nickel dioxide, thionyl chloride, or silver dioxide, or it can include, for instance, ferrate, nickel oxyhydroxide, permanganate or bromate. In some embodiments, the cathode or cathode layer may include, for example, an amorphous vanadium-oxide, VOx, thin film. In some embodiments, the cathode or cathode layer may include manganese, such as manganese dioxide. In some embodiments, the cathode or cathode layer may be a cathode paste, such as Co2O3 paste, or a MnO2 paste. In some embodiments the cathode paste may contain a conductive material at least partly of one or more allotropes of carbon, such as carbon powder, carbon graphite powder or carbon nanotubes.

The anode or anode or anode layer 22 may include, for instance, a metal, such as copper, nickel, lead, iron, chromium, aluminum, magnesium, lithium, lithium tetrachloroaluminate (LiAlCl4), or zinc. For example, in embodiments of the invention, micro batteries contain high-capacity anodes made from porous silicon. In some embodiments, the anode is zinc. In some embodiments, the anode or anode layer may be oxidized at a potential lower than the potential at which the cathode is reduced.

The layer 12 may electrically separate the microbattery components from external components. For example, film 17 may be an insulating material such as a polymer coating resistant to acidic electrolytes, such as an adhesive tape or film including a polyimide, polyethylene, polypropylene, polyurethane, PET, or an epoxy resin coating.

The substrates 18 and 20 may be a non-conductive film that is a flexible polymeric material, such as a polymethylmethacrylate, polyamide, polycarbonate, polyethylene, polystyrene, polyvinyl chloride, polyethylene terephthalate, polyethylene naphtalate, polypropylene, or polyimide material. In some embodiments, the substrates 18 and 20 are a KAPTON substrate.

In some embodiments the contacts 30, 31 comprise at least one metal, such as silver, gold, copper, platinum, zinc, palladium, tungsten, molybdenum, zirconium, tantalum, or combinations thereof. In some embodiments the contacts 30, 31 are a noble metal and in some embodiments the contacts may include a metal such as platinum or zinc.

In some embodiments, the substrates 18 and 20 may be coated on one side with the aforementioned metal coating comprising contacts 30 or 31. In one non-limiting embodiment, the cathode 24 is a cathode paste, and the electrolyte is in a hydrogel and the anode is a zinc anode 22. Electrolyte in hydrogel can include, for example, an electrolyte solution of zinc chloride, ammonia chloride, potassium chloride, potassium hydroxide, and other salts and combination of salts. The hydrogel can be, for example, a silicon oxide gel, sodium silicate gel, and other materials.

The trench 32 is located outside the perimeter of the battery cavity 14 and is cut from the top substrate 18 into or through the bottom substrate 20 except in the metal contact region (e.g., contacts 30, 31) however, the trench 32 will be in fluid communication with slots 15 so that a seal is disposed about the entire periphery of the battery 10. This trench 32 is illustrated in at least FIGS. 3 and 4. After the trench 32 is formed it and slot 15 are then filled with a curable material 34 such as a metal and/or curable polymer, which provides a good sealing and vapor/air barrier. This curable material 34 is illustrated in at least FIGS. 5-8. In one embodiment, the curable material 34 is a UV curable liquid adhesive. One advantage of a UV curable liquid adhesive is that heat does not have to be applied to the battery only ultraviolet light. Thus, the adhesives 16 of the tape layer 12 are not exposed to excessive temperatures that would adversely affect the adhesives 16. The trench 32 and slot 15 confine the fill of the curable material 34 to a form a defined vertical wall joining the top substrate 18 to the bottom substrate 20. The final battery outline is then cut (such as with a cutting tool/laser) through the curable material 34 to define the final shape of the battery 10. Depending on the configuration of tape layer 12 only three sides of the periphery of the battery will have to be cut to define its final shape. Alternatively, the portion of the layer 12 past the metal contacts 30, 31 may need to be cut.

The dimensions of the microbattery may vary based upon the desired application. For example, in some non-limiting embodiments, the microbattery may have a length of 0.1 mm to 10 mm, such as from 0.5 mm to 10 mm, or from 0.5 mm to 5 mm. In some embodiments, the microbattery may have a width of 0.1 mm to 10 mm, such as 0.5 mm to 10 mm, or from 0.5 mm to 5 mm. The microbattery may have a thickness of 0.1 mm to 1 mm, for example 0.1 mm to 0.8 mm, or 0.1 mm to 0.5 mm. Although, specific dimensions are listed above, dimensions greater or less than the aforementioned values are considered to be within the scope various embodiments of the present disclosure.

Figure 7:
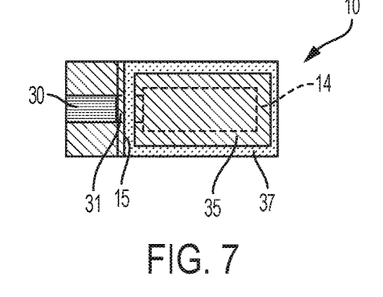
FIG. 7 is a top view of an assembled microbattery during a final step of the sealing process.
Figure 8:
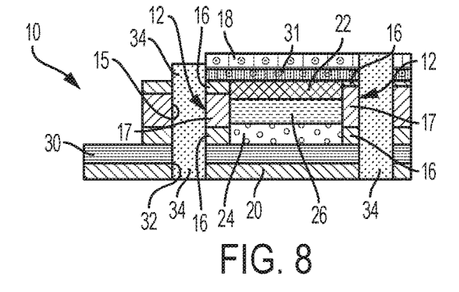
FIG. 8 is a cross section view of the microbattery of FIG. 7.

The final battery structure is illustrated in at least FIGS. 7 and 8. As mentioned above, although battery 10 is illustrated as having a rectangular shape this is merely an example of one non-limiting configuration other non-limiting configurations may include circular, cylindrical, elliptical, oval, etc. and thus the shape of the battery and its components may be configured to anyone of the these configurations. Accordingly, the microbattery 10 is first sealed at its ends and sides by a first seal 35, which may comprise the tape layer or layers 12 including layer 17 and adhesives 16 and then a second or secondary outer seal 37 comprising the curable material 34 is provided about or external to the tape layer or layers 12. The secondary seal 37 also extends between the upper substrate 18 and the lower substrate 20, while a pair of contacts 30, 31 extend from the microbattery 10. In one embodiment, the first seal 35 comprising layer or layers 12 extends between the upper substrate 18 and the lower substrate 20 and the second seal 37 comprising the curable material 34 is disposed about the outer periphery of the first seal and also extends between the upper substrate 18 and the lower substrate 20.

In one embodiment, the curable material 34 may be anyone of a UV-curable epoxy; two part epoxies; acrylics; polyolefins; rubbers silicones; cyanoacryllics; any ethyleneically unsaturated molecule which is capable of being cross-linked by chemical or energetic radiation; and equivalents thereof.

Figure 9:
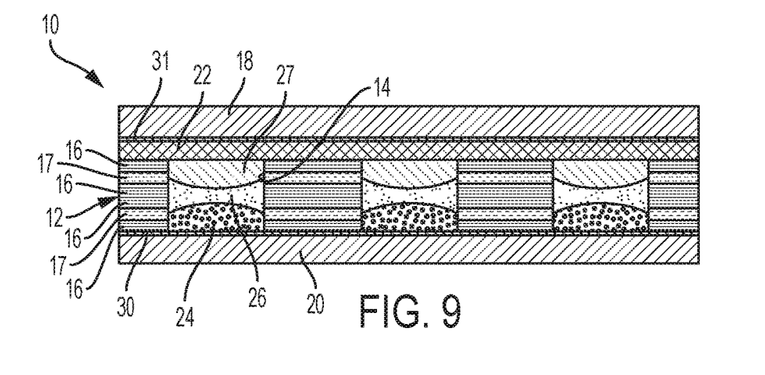
FIGS. 9-13 is a cross sectional views of a plurality of microbatteries being formed by various embodiments of the present disclosure.
Figure 10:
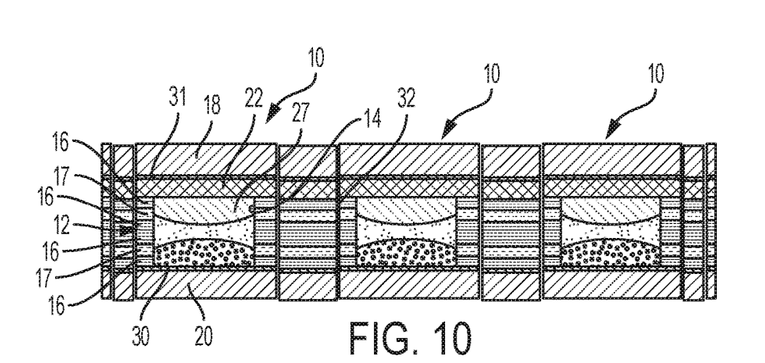
Figure 11:
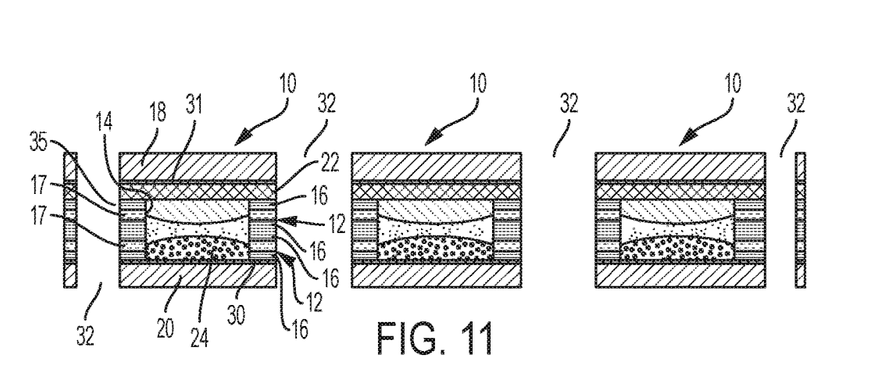
Figure 12:
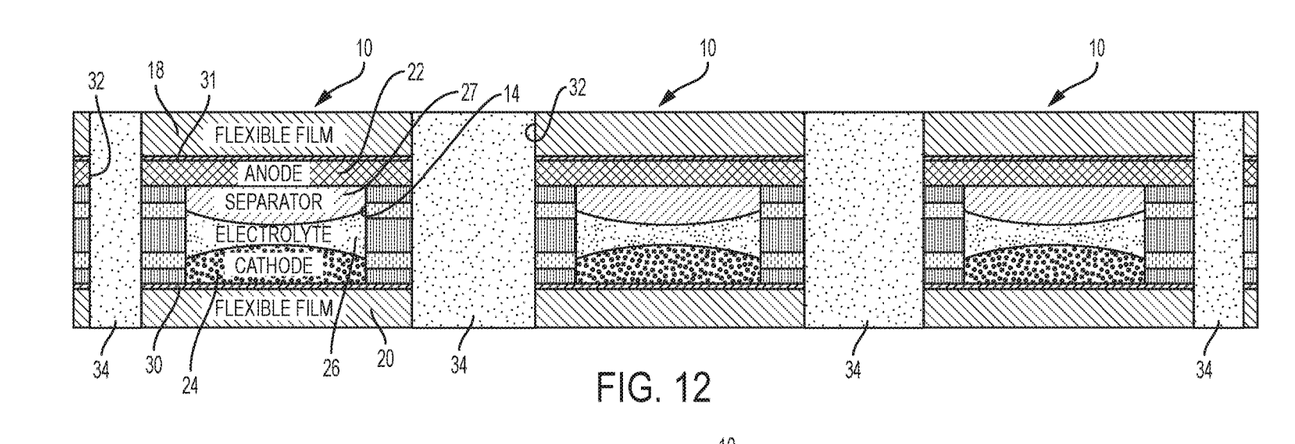
Figure 13:
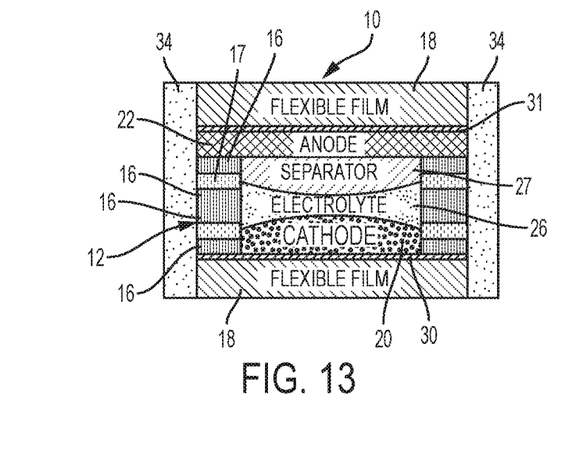
Figure 14:
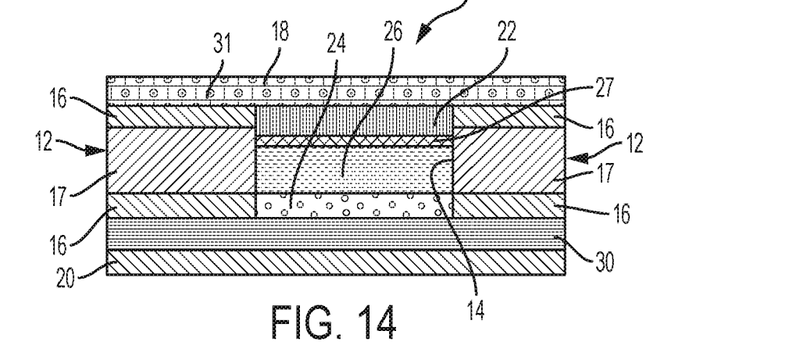
FIG. 14 is a cross section view of a microbattery during a first step of an alternative forming process.
Figure 15:
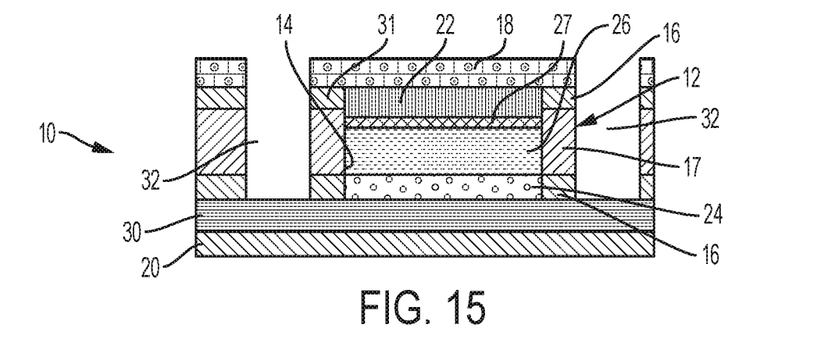
FIG. 15 is a cross section view of the microbattery of FIG. 14 during a second step of the alternative forming process.
Figure 16:
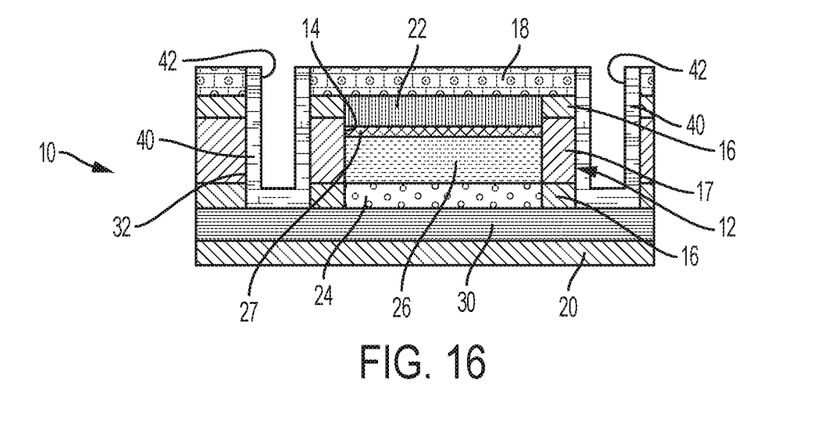
FIG. 16 is a cross section view of the microbattery of FIG. 14 during a third step of the alternative forming process.
Figure 17:
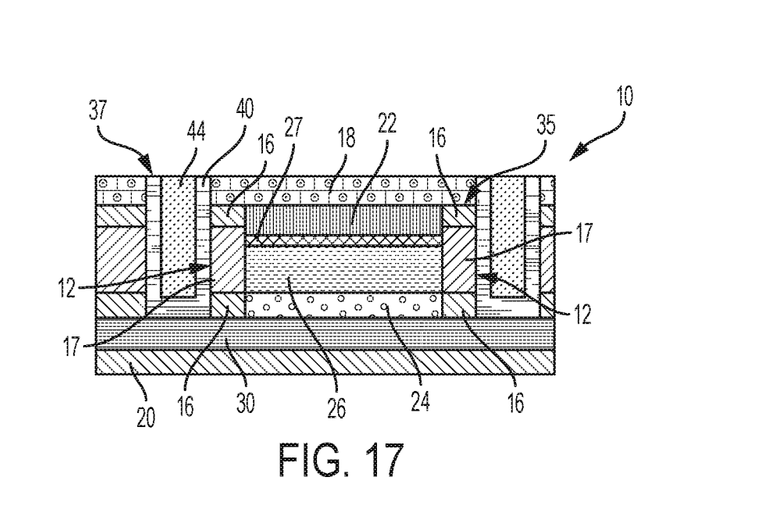
FIG. 17 is a cross section view of the microbattery of FIG. 14 during a fourth step of the alternative forming process.
Figure 18:
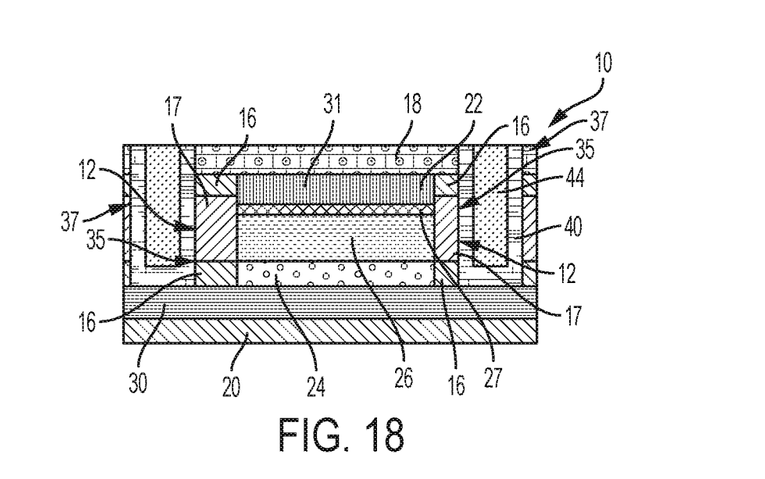
FIG. 18 is a cross section view of the microbattery of FIG. 14 during a fifth step of the alternative forming process.
Figure 19:
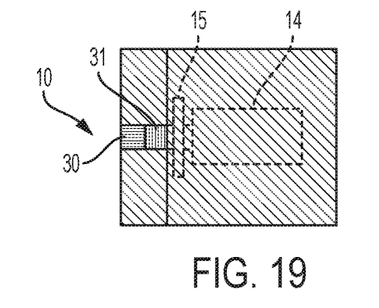
FIG. 19 is a top view of an assembled microbattery prior to a sealing process according to yet another alternative forming process.
Figure 20:
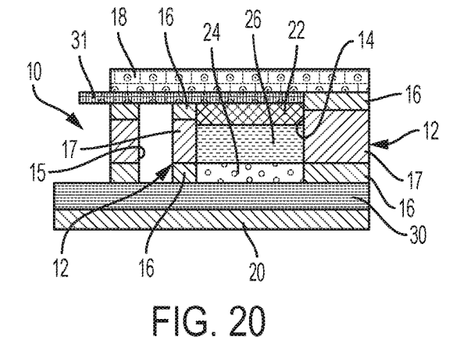
FIG. 20 is a cross section view of the microbattery of FIG. 19.
Figure 21:
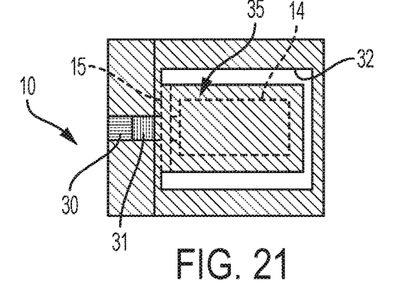
FIG. 21 is a top view of an assembled microbattery during a first step of a sealing process according the alternative forming process of FIG. 19.
Figure 22:
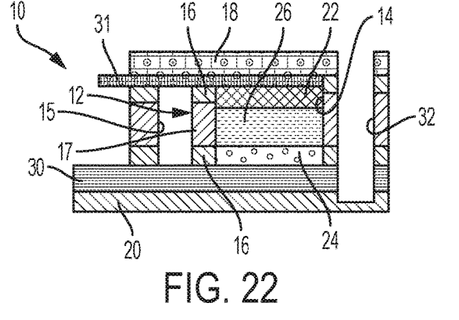
FIG. 22 is a cross section view of the microbattery of FIG. 21.
Figure 23:
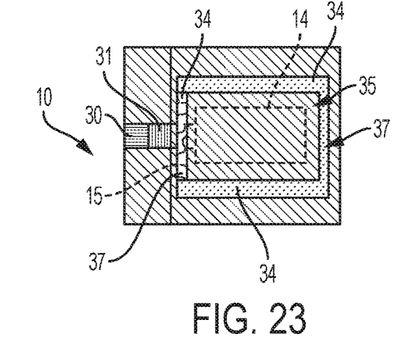
FIG. 23 is a top view of an assembled microbattery during a final step of a sealing process according the alternative forming process of FIG. 19.
Figure 24:
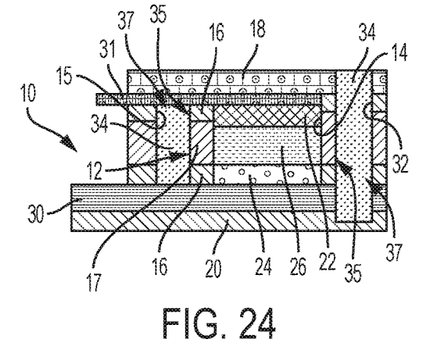
FIG. 24 is a cross section view of the microbattery of FIG. 23.

Referring now to FIGS. 9-13, a process for forming a plurality of microbatteries 10 in accordance with an embodiment of the present disclosure is illustrated. The views of FIGS. 9-13 are cross-sectional views through a section of the battery wherein only trench 32 is illustrated and thus slots 15 are not visible in these views. In FIG. 9 a series of microbatteries 10 are formed by securing substrates 18 and 20 together via the adhesive tape 12, which in one embodiment may comprise more than one layer of adhesive tape. As mentioned above, the tape 12 may comprise precut cavities 14 and slots 15. In this embodiment, a separator layer 27 is located between anode 22 and electrolyte 26. It is also, understood that separator layer 27 may also be used in the embodiment of FIGS. 1-8. In one non-limiting embodiment, the separator layer may be a single or multiple layers/sheets of material and the layer/sheet of material may comprise: nonwoven fibers (cotton, nylon, polyesters, glass) in a manufactured sheet, web or matt of directionally or randomly oriented fibers; polymer films (polyethylene, polypropylene, poly (tetrafluoroethylene), polyvinyl chloride); polyvinylidene fluoride (PVDF) nanofiber webs; polytriphenylamine (PTPAn)-modified separator; and naturally occurring substances (e.g., rubber, wood). In another embodiment, solid ion conductors, may serve as both a separator and the electrolyte. On course, the above list is merely one non-limiting example of the materials contemplated for separator layer 27. After the two substrates 18 and 20 are joined together with the adhesive 16 of the adhesive tape layer or layers 12, the trenches 32 are cut or etched into the plurality of layers 12. This process is illustrated in FIGS. 10 and 11. During this process the width of the cut microbattery prior to the application of curable material 34 is slightly less than the desired width of the battery as the width of the microbattery will be increased after the application of the curable material 34. As illustrated in FIGS. 1-7, the trench 32 and slot 15 are located around the periphery of the battery 10. Afterwards, the trench 32 and slot 15 are filled in with a curable material 34 such as UV-curable epoxy. Other materials used for sealing the trench 32 and slot 15 may also include; two part epoxies; acrylics; polyolefins; rubbers; silicones; cyanoacryllics; and equivalents thereof.

Referring now to FIGS. 14-18, an alternative embodiment of the present disclosure is illustrated. Again, the views of FIGS. 14-18 are cross-sectional views through a section of the battery wherein only trench 32 is illustrated and thus slots 15 are not visible in these views. Here the microbattery 10 is formed in a similar process as the previous embodiment however after the trench 32 is cut, a first sealing material or dielectric fill 40 is disposed in the trench 32 and slot 15 so that an opening 42 remains. Thereafter, a second sealing material or second dielectric fill 44 is applied into opening 42. In one non-limiting embodiment, the first sealing material or first dielectric fill 40 may be a sputtered oxide such as silicon oxide, aluminum oxide, SiN, AN, or UV-curable epoxy; two part epoxies; acrylics; polyolefins; rubbers silicones; cyanoacryllics; and equivalents thereof or any other equivalent materials suitable for providing a dielectric and the second sealing material or second dielectric fill 44 may be a curable material such as UV-curable epoxy; two part epoxies; acrylics; polyolefins; rubbers silicones; cyanoacryllics; and equivalents thereof or another layer of thin metal such as Al, Ni, Ti, Cr, Ag, Au, Ta, Pt, W, In, InSnO, In yet another alternative embodiment additional sealing materials or layers may be applied to the second sealing material or second dielectric fill 44 until the final second seal 37 is formed. For example, second seal may comprise, 3, 4 or more layers comprising anyone or any combination of the aforementioned materials to form the second seal 37.

Referring now to FIGS. 19-24, yet another alternative embodiment of the present disclosure is provided. Here the microbattery 10 is formed in a similar process as the previous embodiment however the slot 15 is covered by top or first substrate 18 and in some instances by contact 31. Thereafter, the trench 32 is formed and as in the previous embodiments the trench 32 is formed to be in fluid communication with slot 15. Thereafter, the curable material 34 is applied to trench 32 and as it is applied into trench 32 and it will flow laterally into slot 15 from either side even though a top portion of slot 15 is covered by substrate 18.

Figure 25:
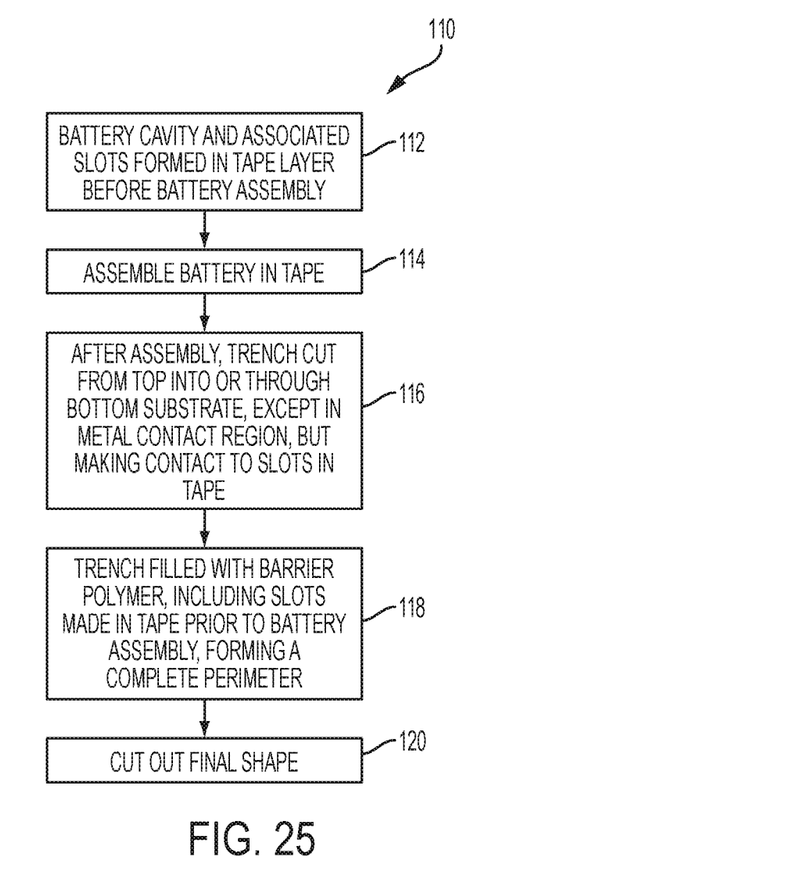
FIG. 25 is a flow chart illustrating the sealing process according to one embodiment of present application.

Referring now to FIG. 25, a flow chart illustrating the steps of a method 110 of forming a microbattery 10 in accordance with various embodiments of the present disclosure is illustrated. At an initial step 112, the battery cavity 14 and associated slots 15 for the metal contacts 30 and 31 is/are formed in layer 12. Then and at step 114, the layer 12 along with layers comprising the substrates 18, 20, the anode 22, the cathode 24, the separator 27, the electrolyte 26 and the metal contacts 30, 31 are secured together. In this step, the adhesives 16 of the layer 12 or layers 12 in addition to film 17 provide a first seal. Thereafter and at step 116, the trench 32 is cut into the layers, which may extend all the way through the bottom substrate 20 except trench 32 does not pass through the metal contact 30 as well as metal contact 31. Thereafter and at step 118, the trench 32 is filed with the curable material 34 including the slots 15 made in the tape 12 prior to the battery assembly. Once the material 34 is cured, the battery 10 is cut into its final shape at step 120 by cutting through the cured material 34.

In accordance with various embodiments of the present invention, a battery is made with film having an opening that defines a cavity for receipt of the anode, cathode, separator, and electrolyte therein and a slot or slots for receipt of contacts therein is glued/attached with adhesives between two substrates with the anode and cathode on or as their surfaces and then a trench is cut to create a second sealing envelope about the first sealing provided by the adhesives of the tape.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of forming a flexible microbattery with a dual seal, the method comprising:
   forming an adhesive film with a cavity therein;
   applying a first outer flexible substrate to a first side of the film;
   applying a second outer flexible substrate to a second opposite side of the film, wherein a cathode, an anode, a separator and an electrolyte are located within the cavity and the film provides a first seal about the cathode, the anode, the separator and the electrolyte, wherein the first seal extends between the first outer flexible substrate and the second outer flexible substrate, wherein the separator is sandwiched between the anode and the electrolyte;
   cutting a trench through the first outer flexible substrate, the film and the second outer flexible substrate after the first seal is formed;
   disposing a curable material in the trench;
   curing the curable material to provide a second seal, the second seal extending between the first outer flexible substrate and the second outer flexible substrate, wherein the first seal is located between the cavity and the second seal;
   wherein a first contact is on the anode and a second contact is on the cathode, such that the first and second contacts extend through the first seal and the second seal; and
   wherein the trench is cut through the second outer flexible substrate so as to stop at a region of the second contact.

2. The method as in claim 1, wherein the second seal is formed from a UV curable material.

3. The method as in claim 1, wherein the second seal is a curable polymer.

4. The method as in claim 1, further comprising the step of cutting through the second seal to define a perimeter of the microbattery.

5. The method as in claim 1, wherein the film is also formed with a slot that is aligned with contacts of the microbattery.

6. The method as in claim 5, wherein the trench extends from opposite ends of the slot and the trench in combination with the slot define the location of the second seal.

7. The method as in claim 1, wherein the second seal further comprises a first dielectric and a second dielectric, the second dielectric being located in an opening defined by the first dielectric, the second dielectric being the curable material.

8. The method as in claim 1, wherein the film is also formed with a slot that is aligned with contacts of the microbattery, wherein the slot is covered by the first outer flexible substrate and the second outer flexible substrate.

9. The method as in claim 8, wherein the trench extends from opposite ends of the slot and the trench in combination with the slot define the location of the second seal.

10. A method of forming a plurality of flexible microbatteries with a dual seal, the method comprising:
    forming an adhesive film with a plurality of cavities therein;
    applying a first outer flexible substrate to a first side of the adhesive film;
    applying a second outer flexible substrate to a second opposite side of the adhesive film, wherein a cathode, an anode, a separator and an electrolyte are located within each one of the plurality of cavities and the adhesive film provides a first seal about the cathode, the anode, the separator and the electrolyte of each of the plurality of batteries, wherein the first seal extends between the first outer flexible substrate and the second outer flexible substrate, wherein the separator is sandwiched between the anode and the electrolyte;

cutting a trench through the first outer flexible substrate, the adhesive film and the second outer flexible substrate of each of the plurality of batteries after the first seal is formed;

disposing a curable material in the trench;

curing the curable material to provide a second seal, the second seal extending between the first outer flexible substrate and the second outer flexible substrate of each of the plurality of batteries, wherein the first seal is located between the cavity and the second seal;

wherein a first contact is on the anode and a second contact is on the cathode, such that the first and second contacts extend through the first seal and the second seal; and wherein the trench is cut through the second outer flexible substrate so as to stop at a region of the second contact.

11. The method as in claim 10, further comprising the step of cutting through the second seal to define a perimeter of each of the plurality of microbatteries.

12. A flexible microbattery, comprising:
a first outer flexible substrate;
a second outer flexible substrate;
an adhesive film located between the first outer flexible substrate and the second outer flexible substrate;
a cathode, an anode and both a separator and an electrolyte located within a cavity of the film, wherein the adhesive film provides a first seal about the cathode, the anode, the separator and the electrolyte, wherein the first seal extends between the first outer flexible substrate and the second outer flexible substrate, wherein the separator is sandwiched between the anode and the electrolyte; and a second seal disposed about an outer periphery of the first seal, the second seal also extending between the first outer flexible substrate and the second outer flexible substrate, the second seal also disposed in a trench that is cut through the first outer flexible substrate, the film and the second outer flexible substrate;

wherein a first contact is on the anode and a second contact is on the cathode, such that the first and second contacts extend through the first seal and the second seal; and wherein the trench is cut through the second outer flexible substrate so as to stop at a region of the second contact.

13. The microbattery as in claim 12, wherein the second seal is formed from a UV curable material.

14. The microbattery as in claim 12, wherein the second seal is a curable polymer.

15. The microbattery as in claim 12, wherein the adhesive film has adhesives located on opposite sides of the film.

16. The microbattery as in claim 12, wherein the adhesive film is a pair of films secured to each other and each of the pair of films has an adhesive located on opposite sides.

17. The micrphattery as in claim 12, wherein the second seal comprises a first dielectric and a second dielectric, the second dielectric being located in an opening defined by the first dielectric.

18. The microbattery as in claim 12, wherein the adhesive film has a slot located therein, the slot being covered by the first outer flexible substrate and the second outer flexible substrate; and wherein the second seal extends through the slot.

* * * * *